US012172466B2

United States Patent
Wendt et al.

(10) Patent No.: US 12,172,466 B2
(45) Date of Patent: Dec. 24, 2024

(54) WHEEL BEARING ASSEMBLY

(71) Applicant: AKTIEBOLAGET SKF, Gothenburg (SE)

(72) Inventors: Volker Wendt, Zell (DE); Rico Dittmar, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 65 days.

(21) Appl. No.: 17/866,758

(22) Filed: Jul. 18, 2022

(65) Prior Publication Data

US 2023/0040525 A1 Feb. 9, 2023

(30) Foreign Application Priority Data

Aug. 5, 2021 (DE) .......................... 102021208528.8

(51) Int. Cl.
  *F16C 41/00* (2006.01)
  *B60B 27/00* (2006.01)
  (Continued)

(52) U.S. Cl.
  CPC ...... *B60B 27/0073* (2013.01); *B60B 27/0068* (2013.01); *F16C 19/386* (2013.01);
  (Continued)

(58) Field of Classification Search
  CPC .... F16C 19/386; F16C 33/7813; F16C 33/80; F16C 33/805; F16C 41/007;
  (Continued)

(56) References Cited

U.S. PATENT DOCUMENTS

2008/0073854 A1* 3/2008 Ishikawa .............. F16J 15/3264
  277/358
2013/0292995 A1* 11/2013 Bosco ................... F16C 33/805
  301/6.8
(Continued)

FOREIGN PATENT DOCUMENTS

DE  19913024 A1 * 10/2000 ............. B60B 27/02
DE  10237210 A1 *  3/2004 ............. B60B 27/02

OTHER PUBLICATIONS

Machine Translation of DE-10237210-A1 (Year: 2004).*
Machine Translation of DE-19913024-A1 (Year: 2000).*

*Primary Examiner* — Alan B Waits
(74) *Attorney, Agent, or Firm* — J-TEK LAW PLLC; Scott T. Wakeman; Mark A. Ussai

(57) ABSTRACT

A wheel bearing assembly for trucks includes a brake element and a wheel adapter defining a rotating component, an axle element defining a stationary component, and a multi-row, preferably double-row, bearing unit. The bearing unit has a first bearing ring, a second bearing ring and a plurality of rolling elements disposed between the first and the second bearing ring. The first bearing ring is connected to a drive shaft, the second bearing ring is connected to the axle element and the wheel adapter is configured to connect the first bearing ring to the wheel and the brake element. A shield is disposed between the brake element and the first bearing ring and/or disposed between the brake element and the axle element and is configured to shield a space defined by the first bearing ring, the wheel adapter and the brake element from entry of particles and/or water.

10 Claims, 4 Drawing Sheets

(51) Int. Cl.
*F16C 19/38* (2006.01)
*F16C 33/78* (2006.01)
*F16C 33/80* (2006.01)

(52) U.S. Cl.
CPC ...... *F16C 33/7813* (2013.01); *F16C 33/7886* (2013.01); *F16C 41/007* (2013.01); *B60B 27/0052* (2013.01); *F16C 33/80* (2013.01); *F16C 2326/02* (2013.01)

(58) Field of Classification Search
CPC .............. F16C 2326/02; F16C 2326/20; F16C 33/7886; B60B 11/06; B60B 27/0015; B60B 27/0073; B60B 27/02; B60B 27/0068; B60B 27/0052
See application file for complete search history.

(56) References Cited

U.S. PATENT DOCUMENTS

| | | | |
|---|---|---|---|
| 2015/0137585 A1* | 5/2015 | Ono | F16C 33/6681 |
| | | | 301/109 |
| 2018/0339549 A1* | 11/2018 | Masuda | F16D 65/186 |
| 2021/0039435 A1* | 2/2021 | White | B60B 27/001 |
| 2023/0265881 A1* | 8/2023 | Wendt | F16C 35/06 |
| | | | 384/565 |

* cited by examiner

WHEEL BEARING ASSEMBLY

CROSS-REFERENCE

This application claims priority to German patent application no. 102021208528.8 filed on Aug. 5, 2021, the entire contents of which are fully incorporated herein by reference.

BACKGROUND OF THE INVENTION

The present invention relates to bearings, and more particularly to wheel bearing assemblies.

In wheel bearing assemblies, in particular for trucks, it is known to use a bearing unit including at least two rolling element rows, wherein a wheel adapter is connected to one of the bearing rings. A brake element and at least one wheel, by means of a rim, are then connected to the wheel adapter, which is usually manufactured from cast iron. The other bearing ring is disposed on a hollow axle element. The torque of the drive shaft is transmitted to the wheel adapter and the corresponding bearing ring by a drive shaft that extends inside the axle element.

The entire assembly consisting of the wheel adapter, the brake element and the bearing unit is typically exposed to external contaminants, such as for example, water, dust and other debris or dirt particles. As the wheel adapter is pushed onto the bearing unit using a sliding seat, these contaminants can cause corrosion of the wheel adapter, and in particular the support surfaces that form the seat for the wheel adapter, and/or cause material removal from the support surfaces so that the seat of the wheel adapter may lock, which may lead to a breakage of the wheel adapter.

SUMMARY OF THE INVENTION

It is therefore the object of the present invention to provide a wheel bearing assembly that is more resistant to corrosion and/or material removal.

This object is achieved by a wheel assembly, in particular for trucks, that includes a brake element and a wheel adapter that define a rotating component, an axle element that defines a stationary component, and a multi row, in particular double row, bearing unit. The brake element can be, for example, a brake disk. The bearing unit has a first bearing ring, a second bearing ring and a plurality of rolling elements that are disposed between the first and the second bearing ring. For example, the rolling elements may be tapered rollers. However, other rolling element types are also conceivable, such as, for example, balls. Furthermore, the bearing unit may be a preassembled bearing unit. Alternatively at least two individual bearings can also form the bearing unit. The first bearing ring is connected to a drive shaft, and the second bearing ring is connected to the axle element. Specifically, the axle element may be hollow, and the drive shaft can pass through the axle element. Furthermore, the wheel adapter is configured to connect the first bearing ring to the wheel and the brake element. In particular, the wheel adapter may be manufactured from metal, for example, from cast iron.

In order to reduce the entry of external contaminants, such as, for example, water, dust, and other particles, and to thereby increase the service life of the wheel bearing assembly, the wheel bearing assembly further includes a shield that is disposed between the brake element and the first bearing ring and/or between the brake element and the axle element and that is configured to shield a space that is defined by the first bearing ring, the wheel adapter, and the brake element against entry of particles and/or water. The shield is preferably manufactured or fabricated from a metal plate.

The shield is preferably installed such that a gap, which is preferably annular, is formed between the brake element and the shield. In particular, the shield can be installed closely spaced from the brake element. Due to the gap, it is made possible that on the one hand the brake element can rotate unimpeded. Furthermore, since the brake element is subjected to relatively high temperatures at least occasionally, for example, after a braking process, heat transmission between the brake element and the shield is reduced by the gap.

According to a further preferred embodiment, the shield includes a leg extending in the axial direction, wherein the shield is attached by the leg to the bearing ring or the axle element in a friction-fit and/or interference-fit manner. Preferably, the shield is pressed onto the axle element or the bearing ring to securely attach the shield thereto, which enables the shield to preferably be exchangeable or replaceable.

In certain embodiments, the shield is preferably installed on the axle element. Since the axle element is preferably stationary, the shield is thereby advantageously also stationary or fixed. Additionally, in this case the shield is disposed on the axially inner side of the bearing unit, whereby the shield also acts or functions as a type of seal for the bearing unit. In other words, the shield not only protects the space that is defined by the first bearing ring, the wheel adapter, and the brake element from the entry of particles and/or water, but additionally protects the bearing unit so that maintenance expenses for the bearing unit, and in particular its seals, can be reduced.

According to a further preferred embodiment, the wheel bearing assembly further includes an encoder for an anti-locking system that is disposed on an axially inner end surface of the bearing unit. The shield and the encoder are preferably formed one-piece or integrally formed. The installation of the shield and the encoder can thereby be simplified since only a single component needs to be installed.

Alternatively, the encoder may be disposed between the bearing unit and the shield, and the shield can include an opening through which a sensor for reading the encoder is insertable. This has the advantage that the shield also acts as shield for the encoder so that it is also protected from external contaminants.

According to a further preferred embodiment, the wheel adapter and/or the brake element is provided with at least one opening that is configured to connect the space to a wheel outer side, i.e., to a space exterior of the wheel. In particular, water and other contaminants that accumulate in the space can thereby "drain off" outwardly from the space so that rust formation in the fitting region between the bearing ring and the wheel adapter, as well as a removal or "washing-out" of pastes and media applied to prevent rust formation, can be effectively counteracted.

Further advantages and advantageous embodiments are specified in the description, the drawings, and the claims. Here in particular the combinations of features specified in the description and in the drawings are purely exemplary so that the features can also be present individually or combined in other ways.

BRIEF DESCRIPTION OF THE SEVERAL VIEWS OF THE DRAWINGS

In the following the invention is described in more detail using the exemplary embodiments depicted in the drawings.

Here the exemplary embodiments and the combinations shown in the exemplary embodiments are purely exemplary and are not intended to define the scope of the invention. This scope is defined solely by the pending claims.

DETAILED DESCRIPTION OF THE INVENTION

In the following, identical or functionally equivalent elements are designated by the same reference numbers.

Figure 1:
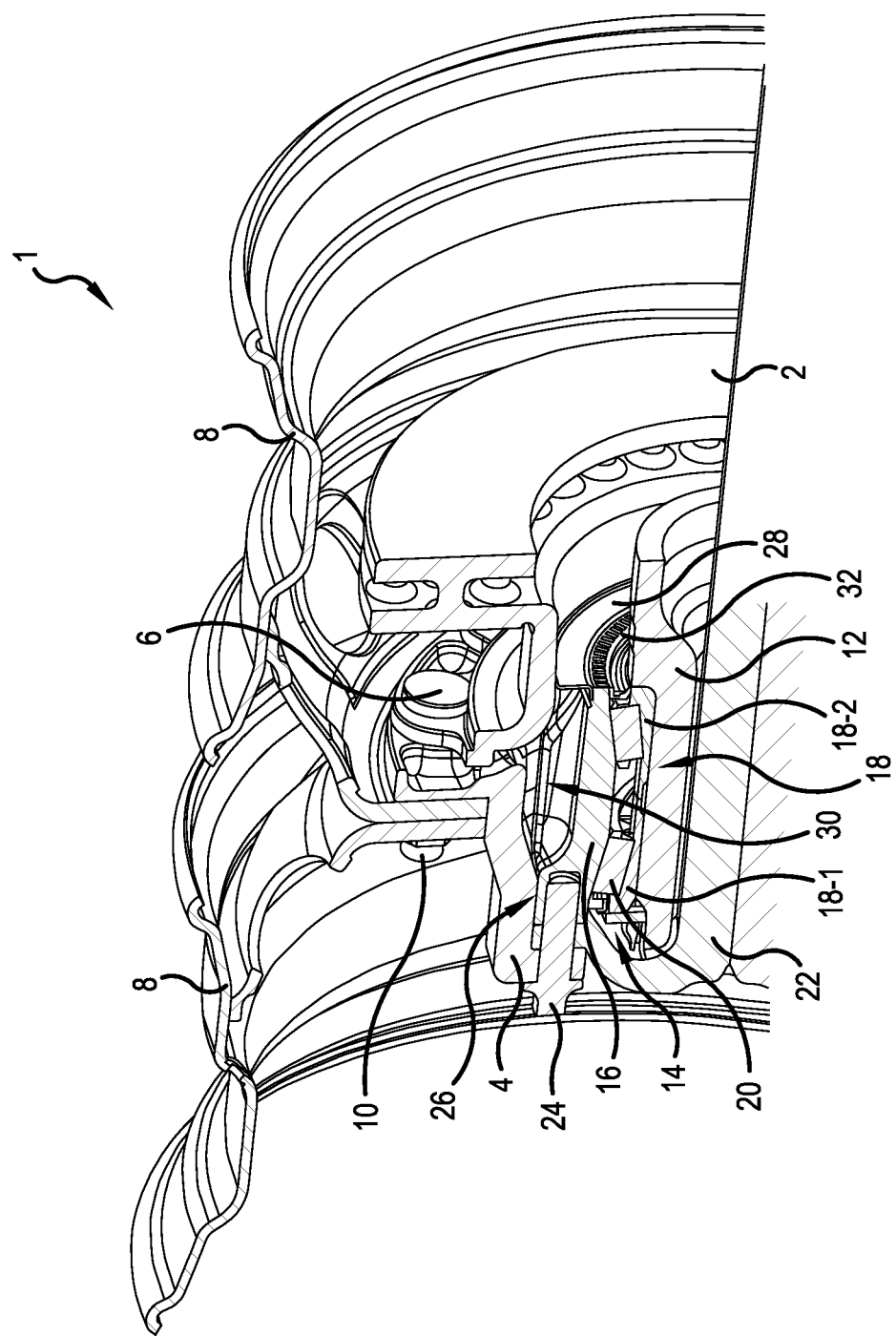
FIG. 1 shows a perspective axial sectional view through a wheel bearing assembly according to a first embodiment.

FIG. 1 shows a perspective axial sectional view through a wheel bearing assembly 1 according to a first embodiment. The wheel bearing assembly 1 is in particular a wheel bearing assembly for trucks and comprises a brake element 2, in particular a brake disk, and a wheel adapter 4, the brake element 2 and the wheel adapter 4 defining a rotating component.

The brake element 2 includes attachment means 6 attached to the wheel adapter 4 and disposed on a radially inner side of the wheel bearing assembly 1, i.e., on the side of the wheel bearing assembly 1 toward the vehicle interior or the "inboard side". Furthermore at least one rim 8 including further attachment means 10 is attached to the wheel adapter 4. In the completely installed state the rim 8 is part of a wheel.

The wheel bearing assembly further comprises an axle element 12 defining a stationary component, for example, an axle stub, and a double row bearing unit 14 including a first bearing ring 16, a second bearing ring 18 and a plurality of rolling elements 20. The first, outer ring 16 is preferably configured one-part (i.e., of one-piece construction) in the example of FIG. 1 and the second, inner ring 18 is preferably configured two-part (i.e., formed of two inner rings 18-1, 18-2) in the example of FIG. 1, although the inner ring 18 may alternatively be a single or one piece bearing ring. The plurality of rolling elements 20 are preferably tapered rollers, but may be balls or any other type of rolling elements, and are disposed between the outer ring 16 and the two preferred inner rings 18-1, 18-2. The outer ring 16 is connected to a drive shaft 22 that extends through the axle element 12, the axle element 12 preferably being attached to the outer ring 16 by attachment means 24 (preferably a plurality of fasteners), and the inner rings 18-1, 18-2 are connected to the axle element 12. Although the bearing unit 14 is preferably a double row bearing as shown and described, the bearing unit 14 may alternatively be a single row bearing or have three or more bearing rows (neither alternative shown).

The outer ring 16 includes a region on a radial outer side that is configured as a cylindrical casing and has a support surface 26 disposed on a radially inner side of the wheel adapter 4, such that the adapter 4 is supported on the bearing ring 16. The region of the outer ring 16 on which the wheel adapter 4 is supported is formed in the shape of a cylindrical casing. On the region of the outer ring 16 providing the support surface 26, a paste can be applied that prevents so-called fretting and general corrosion.

In order to reduce the entry of external contaminants, such as, for example, water, dust, and other particles, and to thereby lead to an increase of the service life of the wheel bearing assembly 1, the wheel bearing assembly 1 further includes a shield 28. The shield 28 is disposed between the brake element 2 and the outer ring 16 and is configured to shield a space 30, which is defined by the outer ring 16, the wheel adapter 4 and the brake element 2, from entry of particles and/or water. The shield 28 is preferably manufactured or fabricated from a metal plate.

Furthermore, an encoder 32 for an anti-locking system is disposed on an axially inner end surface of the outer ring 16 of the bearing unit 14 and has elevations or projections 34 (FIG. 4) disposed adjacently in the circumferential direction and extending in the axial direction. That is, the elevations/projections 34 project axially from the inner end surface of the outer ring 16 and are spaced circumferentially apart. The elevations/projections 34 are used by a sensor 36 (FIG. 3) for measuring a rotational speed of the outer ring 16.

Figure 2:
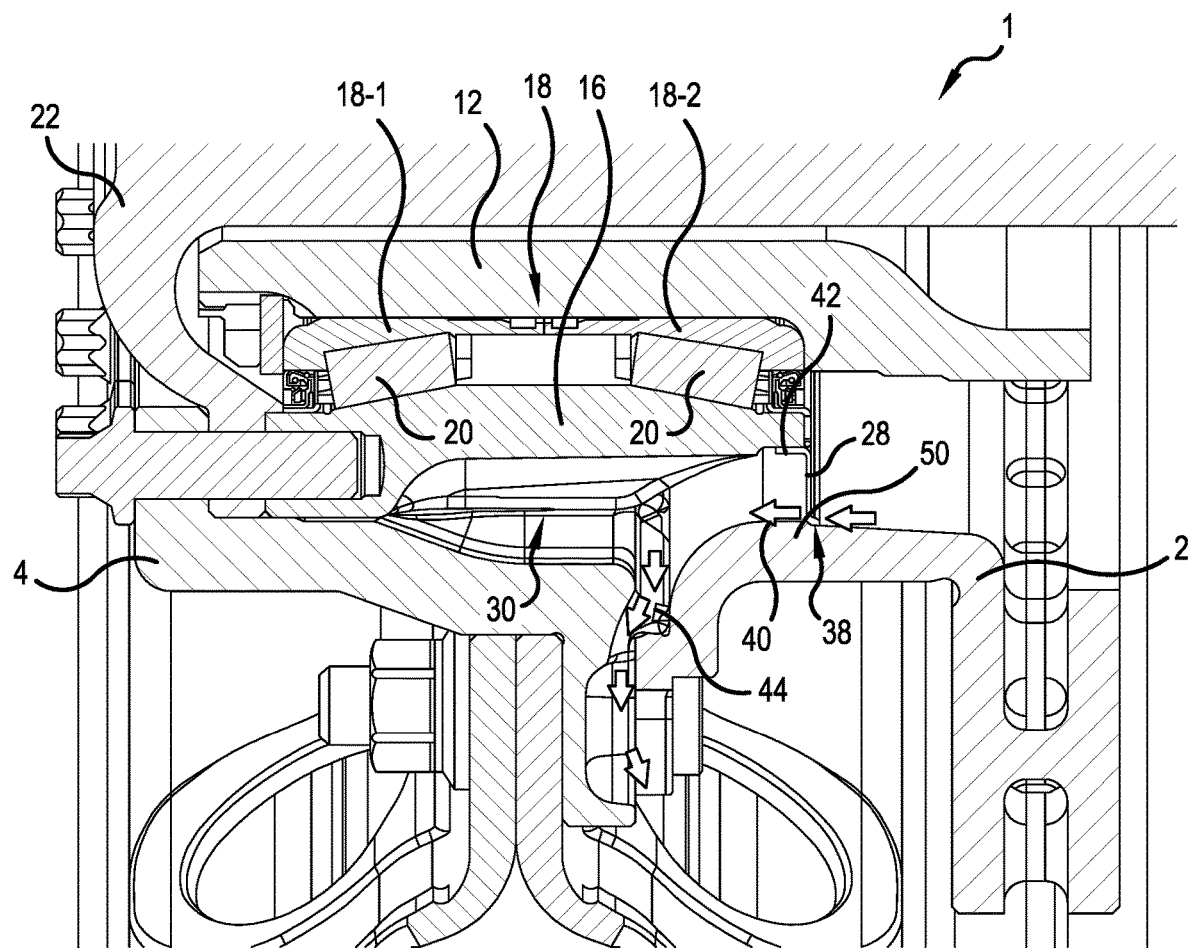
FIG. 2 shows a detail view of the wheel bearing assembly of FIG. 1.

As best shown in FIG. 2, the shield 28 is installed in the wheel bearing assembly 1 such that a gap 38, which is preferably annular, is formed or defined between the brake element 2 and a first leg 50 of the shield 28, the leg 50 extending generally axially away from the bearing unit 14. As can be seen in FIG. 2, the shield 28 is closely spaced from the brake element 2 in order to reduce as much as possible or minimize the entry of water (indicated by arrows 40) into the space 30. The gap 38 enables the brake element 2 to rotate unimpeded while reducing heat transmission between the brake element 2 and the shield 28.

Preferably, an inner wall of the brake element 2 is configured conical (i.e., is formed generally conical) and has a diameter that increases toward a wheel axle center (not indicated). Due to the conical structure of the brake element 2 having a diameter increasing toward the wheel axle center, a pumping effect occurs due to the effect of centrifugal forces which helps to pump wastewater, and other contaminants, away from the bearing unit 14, and thus supports the goal of keeping the interior space 30 free of contaminants.

The shield 28 further includes a second leg 42 extending axially in a direction generally toward the bearing unit 14, the shield 28 being attached to the outer ring 16 by a friction fit and/or interference fit between the second leg 42 and the ring 16. Thereby, the shield 28 can be pressed onto the outer ring 16. Preferably, the shield 28 is exchangeable or configured to be replaceable; in other words, the structure and manner of installation of the shield 28 within the bearing assembly 1 enables the shield 28 to be exchanged or replaced with another, newer shield 28 after a period of use.

As is indicated by the arrows 40 in FIG. 2, it is possible that water and other contaminants may enter the space 30 through the gap 38. In order to prevent such water and/or other contaminants from remaining in the space 30 and causing corrosion of and/or material removal from the wheel adapter 4, the brake element 2 and/or on the outer ring 16, the wheel adapter 4 is preferably provided with at least one opening 44 that is configured to connect the space 30 to a wheel outer side; that is the opening 44 fluidly connects the space 30 with a space exterior of the wheel. Specifically, water and other contaminants that may accumulate in the space 30 can thereby flow outwardly from the space 30 through the opening(s) 44, as is indicated by the arrows 40, so that rust formation in the fitting region and the removal or "washing out" of pastes and other media applied to prevent fretting between the outer ring 16 and the wheel adapter 4 can be effectively counteracted. Alternatively or additionally, the at least one opening 44 can also be formed in the brake element 2.

Figure 3:
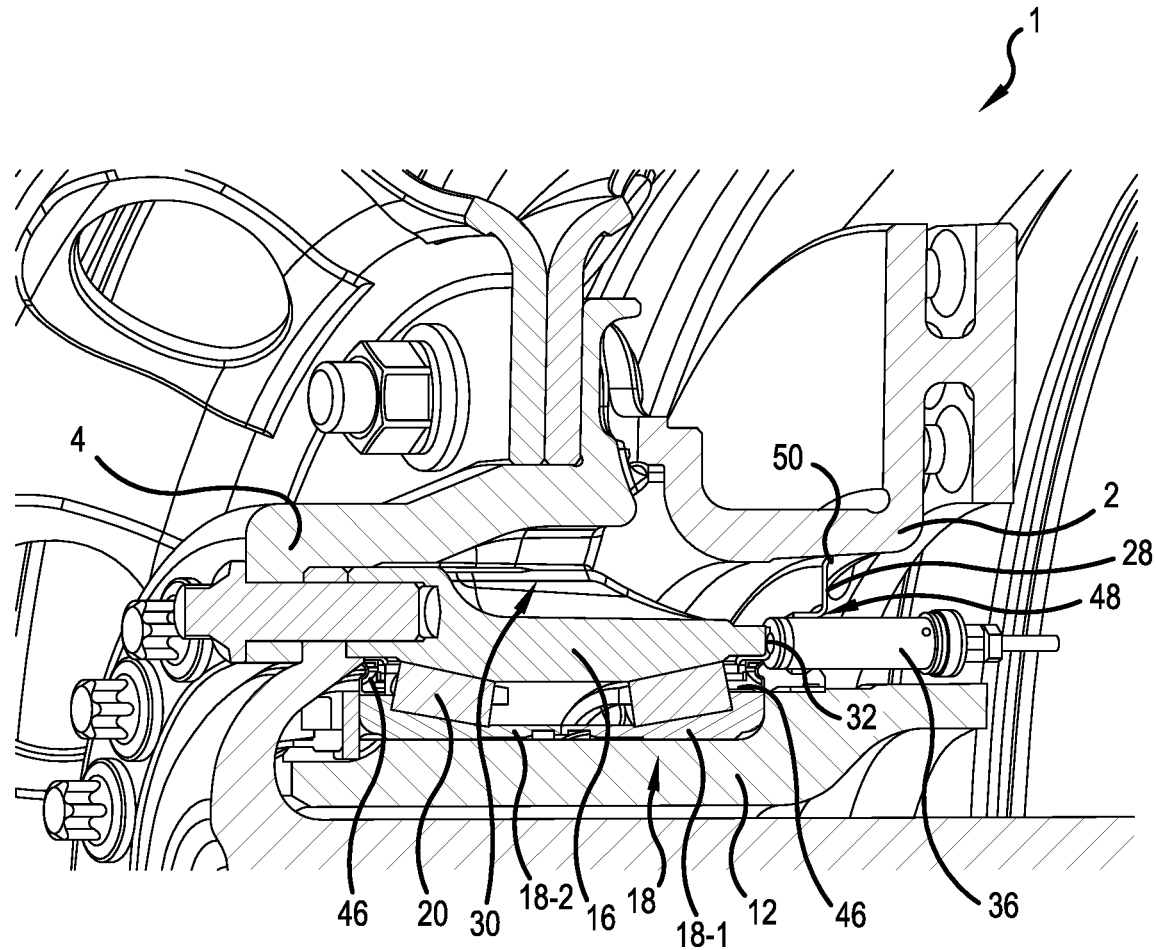
FIG. 3 shows a sectional view through a wheel bearing assembly according to a second embodiment.
Figure 4:
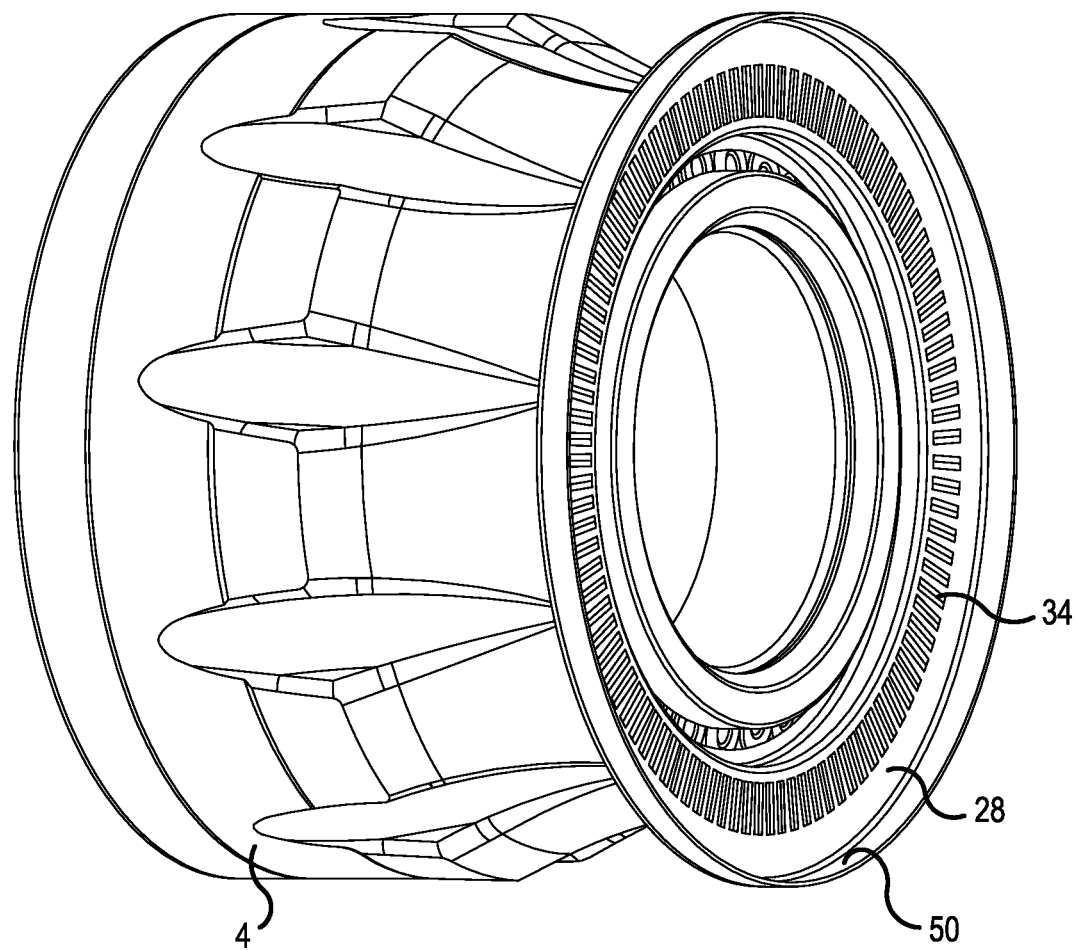
FIG. 4 shows a perspective view of a wheel adapter and a shield of a wheel bearing assembly according to a third embodiment.

Alternative exemplary embodiments of the wheel bearing assembly 1 are depicted in FIGS. 3 and 4. Essentially identical components, features, and functions are numbered with the same reference numbers. The following description is substantially limited to the differences from the exemplary embodiment in FIGS. 1 and 2, wherein with respect to components, features, and functions remaining the same, reference can be made to the description of the exemplary embodiment in FIGS. 1 and 2.

In a second embodiment of the wheel bearing assembly 1 shown in FIG. 3, the shield 28 is installed on the stationary axle element 12. That is, in contrast to the shield 28 of FIGS. 1 and 2, the shield 28 of FIG. 3 is fixed or non-rotational. Furthermore, the shield 28 is disposed on the axially inner side of the bearing unit 14, such that the shield 28 additionally acts as a type of seal 46 for the bearing unit 14. In other words, the shield 28 not only protects the space 30 that is defined by the outer ring 16, the wheel adapter 4, and the brake element 2 from the entry of particles and/or water, but additionally also protects the bearing unit 14 so as to reduce the maintenance expense for the bearing unit 14, particularly the costs of repair or replacement of the other seals 46.

As the encoder 32 is disposed on the outer ring 16, as also shown in FIGS. 1 and 2, the encoder 32 is located axially between the bearing unit 14 and the shield 28 in the embodiment of FIG. 3. Therefore, the shield 28 is preferably provided with an opening 48 or "sensor receptacle" through which a sensor 36 is inserted for detecting the encoder 32. That is, the opening 48 is configured to receive the sensor 36, preferably with a press fit. Such an arrangement has the advantage that the shield 28 also acts as a shield for the encoder 32 to thereby protect the encoder 32 from external contaminants.

In a third embodiment shown in FIG. 4, the shield 28 and the encoder 32 are formed one-piece (i.e., the encoder 32 is integral with the shield 28) and the shield 28 is attached to the outer ring 16 by the leg 42 extending toward the bearing unit 14 (see FIG. 2). As such, in contrast to FIG. 3, the shield 28 of the third embodiment shown in FIG. 4 is rotational, i.e., rotates with the outer ring 16. As described above, the encoder 32 includes elevations or projections 34 disposed adjacent in the circumferential direction and extending in the axial direction, i.e., the elevations/projections 34 extend axially from the shield 28 and are spaced circumferentially apart. The elevations/projections 334 are used or detected by the sensor 36 (FIG. 3) for measuring a rotational speed of the outer ring 16. Furthermore, in FIG. 4 the first leg 50 extends axially away from the bearing unit 14, which in an installed state forms the annular gap 38 together with the brake element 2 (see FIG. 2).

In summary, a wheel bearing assembly 1 is provided that includes a shield 28 that shields the space 30, which is defined by the first bearing ring or the outer ring 16 of the bearing unit 14, the wheel adapter 4 and the brake element 2, from entry of particles and/or water. Furthermore, at least one opening 44 is preferably provided in the wheel adapter 4 and/or the brake element 2, through which water and other contaminants, which have entered into the space 30 through the shield 28, can pass outwardly from the space 30. Such opening(s) 44 enables a reduction of corrosion and/or material removal and/or the washing-out of pastes and other media used to prevent fretting, which can occur, for example, on the wheel adapter 4 and/or the outer ring 16 in the region of the support surface 26 of the wheel adapter 4, thereby increasing the service life of the wheel adapter 4.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST

1 Wheel bearing assembly
2 Brake element
4 Wheel adapter
6 Attachment means
8 Rim
10 Attachment means
12 Axle element
14 Bearing unit
16 First bearing ring
18 Second bearing ring
20 Rolling element
22 Drive shaft
24 Attachment means
26 Support surface
28 Shield
30 Space
32 Encoder
34 Elevations/projections
36 Sensor
38 Gap
40 Arrows
42, 50 Leg
44 Opening
46 Bearing seal
48 Opening

We claim:
1. A wheel bearing assembly for a truck, the truck having a drive shaft and at least one wheel, the wheel bearing assembly comprising:
a brake element and a wheel adapter defining a rotating component;
an axle element defining a stationary component;

a bearing unit including a first bearing ring connected to the drive shaft and formed separately from the wheel adapter, a second bearing ring connected to the axle element, and a plurality of rolling elements disposed between the first bearing ring and the second bearing ring, the wheel adapter being configured to connect the first bearing ring to the wheel and the brake element; and a shield having an inner radial end attached directly to an outer circumferential surface of the axle element and an outer radial end spaced radially inwardly from an inner circumferential surface of the brake element, the shield being configured to shield a space at least partially bounded by an outer circumferential surface of the first bearing ring, an inner circumferential surface of the wheel adapter and an inner circumferential surface of the brake element so as to prevent entry of particles and/or water into the space.

2. The wheel bearing assembly according to claim 1, wherein the shield is located such that a gap is formed between the brake element and the shield.

3. The wheel bearing assembly according to claim 1, wherein the shield includes a leg extending in an axial direction, the leg attaching the shield to the first bearing ring or to the axle element by a friction fit and/or interference fit such that the shield is pressed on the bearing ring or the axle element.

4. The wheel bearing assembly according to claim 1, wherein the shield is fixedly installed on the axle element.

5. The wheel bearing assembly according to claim 1, further comprising an encoder for an anti-locking system, the encoder being disposed on an axially inner end surface of the bearing unit.

6. The wheel bearing assembly according to claim 5, wherein the encoder is integrally formed with the shield.

7. The wheel bearing assembly according to claim 5, wherein the encoder is disposed between the bearing unit and the shield and the shield includes an opening configured to receive a sensor for detecting the encoder.

8. The wheel bearing assembly according to claim 1, wherein the shield is fabricated from a metal plate.

9. The wheel bearing assembly according to claim 1, wherein the shield is configured to be replaceable.

10. The wheel bearing assembly according to claim 1, wherein the wheel adapter and/or the brake element is provided with at least one opening configured to fluidly connect the space with a space exterior of the wheel.

* * * * *